United States Patent
Karlsson

[15] 3,643,994
[45] Feb. 22, 1972

[54] EXCAVATOR WITH AN OPERATOR'S CAB

[72] Inventor: Hans Egron Karlsson, Sater, Sweden
[73] Assignee: Aktiebolaget Bofors, Bofors, Sweden
[22] Filed: Dec. 10, 1969
[21] Appl. No.: 883,855

[30] Foreign Application Priority Data

Dec. 12, 1968 Sweden..................................17058/68

[52] U.S. Cl. .........................................................296/28 C
[51] Int. Cl........................................................B62d 33/06
[58] Field of Search ......................296/28, 28 C, 146, 99, 102

[56] References Cited

UNITED STATES PATENTS

| | | | |
|---|---|---|---|
| 2,529,200 | 11/1950 | Swanson | 296/28 C |
| 2,583,918 | 1/1952 | Wilson | 296/28 C |
| 3,360,295 | 12/1967 | Reynolds | 296/28 C |
| 3,362,373 | 1/1968 | Mycroft | 296/146 X |

FOREIGN PATENTS OR APPLICATIONS

| | | | |
|---|---|---|---|
| 660,542 | 11/1951 | Great Britain | 296/28 C |
| 141,339 | 7/1953 | Sweden | 296/28 C |

*Primary Examiner*—Leo Friaglia
*Assistant Examiner*—John Pekar
*Attorney*—Hane & Baxley

[57] ABSTRACT

An excavator with an operator's cab which includes a cap which is displaceable from a forward end position in which it sealingly engages the front wall of the cab, to any desired rear position to expose a corresponding portion of the cab to the surrounding atmosphere for ventilating the cab.

4 Claims, 3 Drawing Figures

PATENTED FEB 22 1972 3,643,994

INVENTOR.
HANS EGRON KARLSSON
BY Hane and Baxley
ATTORNEYS

EXCAVATOR WITH AN OPERATOR'S CAB

The present invention relates to an excavator with an operator's cab which comprises a front end wall, two sidewalls and a rear end wall, the walls being provided with windows.

BACKGROUND OF THE INVENTION

In hitherto known excavators the operator's cab has stationary walls, one of the walls being provided with a door. Upon operating the excavator violent noise will occur from the digging aggregate as well as from the engine of the excavator. This noise is extremely tiring to the operator. Further, during the hot season the temperature in the cab will often become troubling to the operator.

SUMMARY OF THE INVENTION

The object of the present invention is to provide an operator's cab which particularly during the hot season may readily be adjusted for obtaining a desired ventilation of the cab. This is attained in an excavator having an operator's cab which according to the invention is characterized in that the walls of the cab comprise an upper portion provided with windows and a lower portion which supports a cap which is formed by the upper portions of the sidewalls and the rear end wall, said cap being displaceably mounted at the upper edges of the lower portions of the sidewalls to be moved from a front end position, where the cap sealingly engages the upper portion of the front end wall, and a rear position in which the cap will expose at least part of the space above the lower portion of the cab to the surrounding atmosphere. In this manner the operator will be means of simple mechanical means be enabled to control the ventilation in the cab and if he so desires the cap may be moved to a rear end position exposing the whole space above the lower portion of the cab. Thus, the operator will work under considerably more convenient working conditions than has hitherto been possible with the known constructions of cabs under consideration.

A preferred embodiment of the invention is shown by way of example in the annexed drawing.

Figure 1:
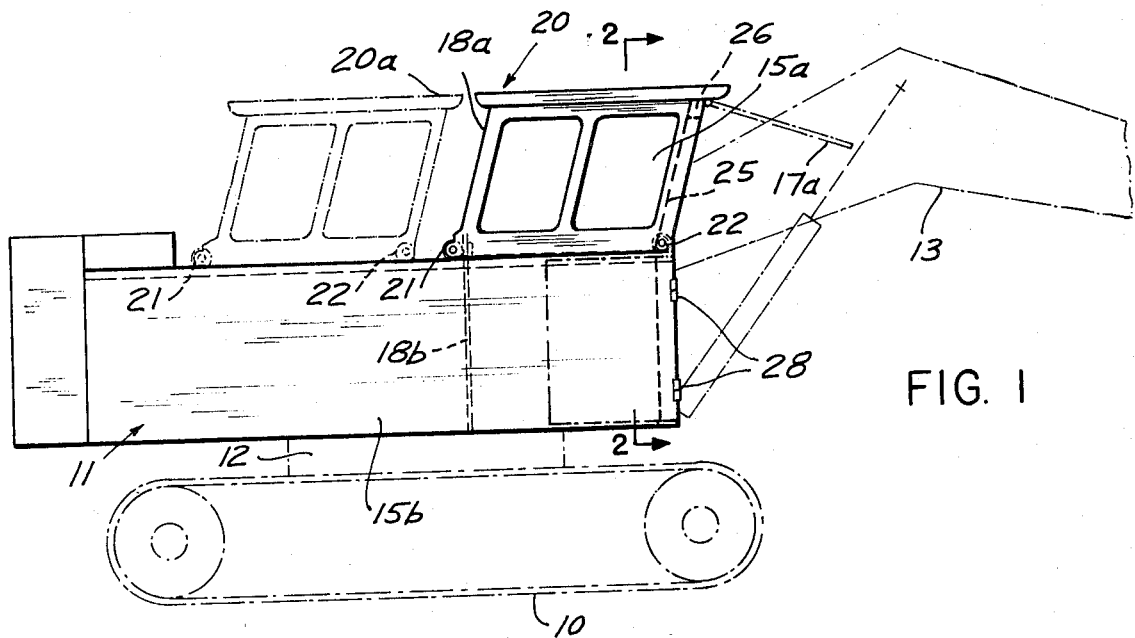
FIG. 1 is an elevational side view of an excavator according to the invention.

The excavator diagrammatically shown in FIG. 1 is supported by endless conveying belts or tracks 10 and has a frame 11 which is rotatable about a bearing 12 and carries a digging or earth moving aggregate 13. The digging aggregate is mounted on the frame 11 in a position located beside the operator'2 cab, as shown, so that the operator has a free sight downwardly at one side of the digging aggregate.

The cab comprises two sidewalls, a front end wall and a rear end wall. The sidewalls comprise an upper portion 14a and 15a, respectively, and a lower portion 14b and 15b, respectively, secured to the bottom 16 of the cab. The front end wall comprises an upper portion 17a and a lower portion 17b. In the same manner the rear end wall comprises an upper portion 18a and a lower portion 18b.

Figure 3:
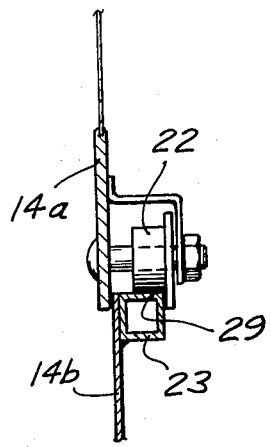
FIG. 3 is a sectional view of the guide means for the cab of the excavator.

In accordance with the invention, the upper portions 14a, 15a of the sidewalls and the upper portion 18a of the rear end wall and a roof 19 form together a cap or enclosure which is generally denoted by reference numeral 20. At the lower edges of the upper sidewall portions 14a, 15a the cap is provided with rollers 21, 22 which are guided along rails 23 located at the upper edges of the side wall portions 14b, 15b, as is shown in FIG. 3.

Accordingly, the cap 20 may be displaced from the full line position shown to the rear end position indicated by dotted lines 20a.

At the front end of the bottom 16 there is secured a substantially vertical U-shaped frame member 30 having two vertical legs 24, 25 which at their upper ends are connected by cross members 26.

The upper portion 17a of the front end wall includes a window 31 which by means of hinges 27 is at its upper edge pivotally connected to the cross member 26 so that the window 31 may be swung out to the position indicated by dotted lines in FIG. 1.

The lower portion 17b of the end wall is by means of hinges 28 pivotally connected to the leg 25 and may be swung to the position indicated by dotted lines in FIG. 1 where the portion 17b is lying along the outer side of the lower sidewall portion 15b, that is, portion 17b constitutes a door.

Figure 2:
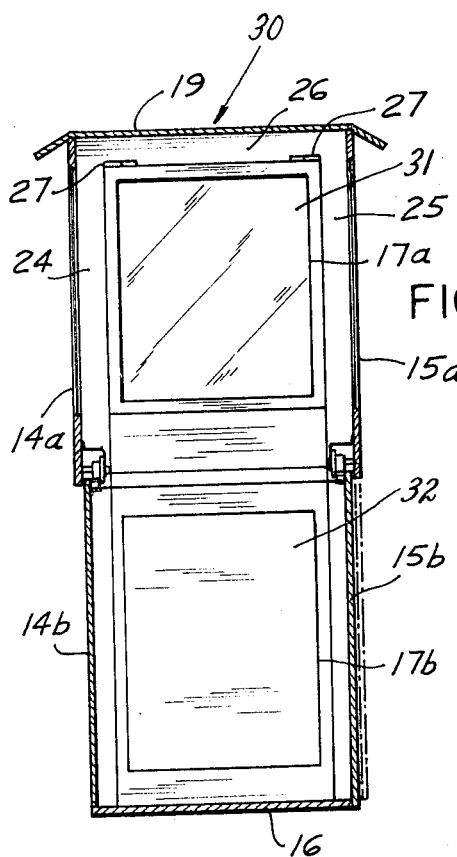
FIG. 2 is a sectional view taken on line 2—2 of FIG. 1.

As indicated in FIG. 2, the lower end wall portion 17b is provided with a window 32 so that the operator has a good sight forwards through the window portion 17a as well as obliquely downwardly through the window 32.

In order to prevent fogging on the side windows each guide rail 23 for the cap may form a flow channel for hot air which flows out through holes 29 and further upwards along the inner sides of the windows.

I claim:

1. An operator's cab of an excavator, said cab comprising two sidewalls, a front wall, a rear wall, a base and a roof, each of said walls being horizontally divided into an upper and a lower portion, the lower portions of the sidewalls and of the rear wall being secured to the base and one upright edge of the lower portion of the front wall being hinged to the lower portion of one of the sidewalls to constitute a door, the upper wall portions and the roof being joined to form an enclosure; and guide means slidably supporting said enclosure on the lower sidewall portions for displacing the enclosure between a forward position and a rearward position, for exposing at least a part of said lower portions to the atmosphere the upper side wall portions and the upper and lower front wall portion including window panes, the window pane in the upper front wall portion being hingedly mounted to said portion for opening said pane by tilting the same.

2. The cab according to claim 1 wherein the horizontal lengths of the lower sidewall portions are greater than those of the upper sidewall portions.

3. The cab according to claim 2 wherein the upper front wall portion comprises a downwardly facing U-shaped member, the base of said member mounting hinge means for the window pane in said portion.

4. The cab according to claim 1 wherein said guide means comprise rollers mounted at the lower corners of the upper front wall and the rear wall portions and the upper edges of the lower sidewall portions comprise guide tracks for said rollers for effecting said displacement of the enclosure relative to the lower sidewall portions.

* * * * *